June 19, 1956    G. E. HENNING    2,750,626
APPARATUS FOR PLASTICIZING AND STRAINING ORGANIC PLASTIC COMPOUNDS
Filed Oct. 6, 1954    2 Sheets-Sheet 1
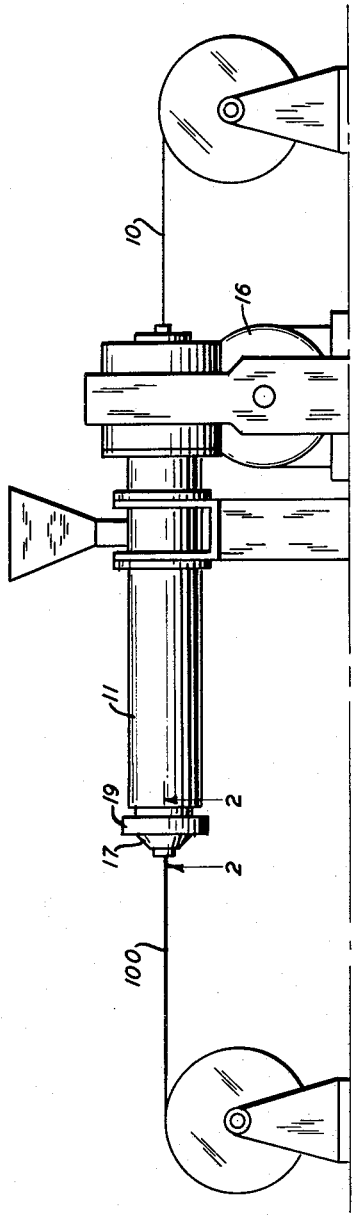
FIG. 1
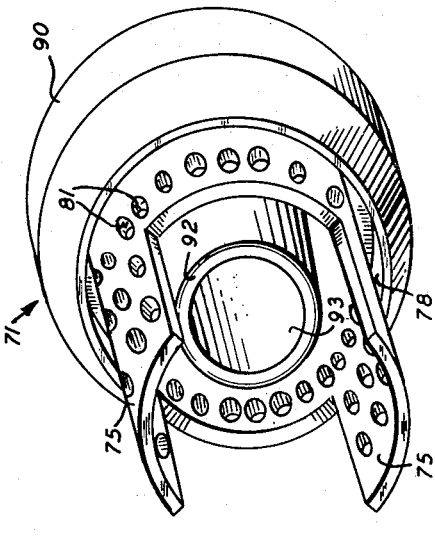
FIG. 3
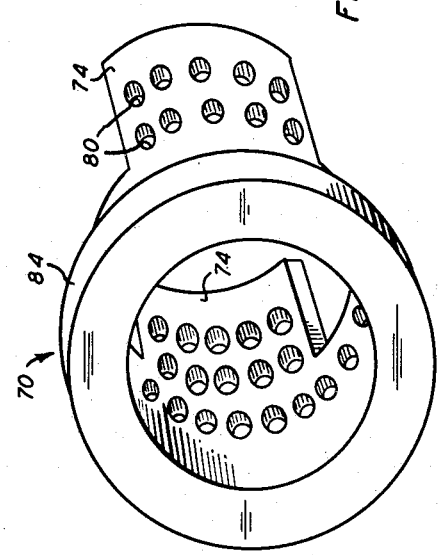
INVENTOR.
G. E. HENNING
BY
ATTORNEY

United States Patent Office 2,750,626
Patented June 19, 1956

2,750,626

APPARATUS FOR PLASTICIZING AND STRAINING ORGANIC PLASTIC COMPOUNDS

George E. Henning, Baltimore, Md., assignor to Western Electric Company, Incorporated, New York, N. Y., a corporation of New York Application October 6, 1954, Serial No. 460,573

8 Claims. (Cl. 18—13)

This invention relates to apparatus for plasticizing and straining organic plastic compounds.

In one type of extrusion apparatus used in the manufacture of insulated conductors, a plastic insulating compound is extruded into a continuous concentric covering about a filamentary core which is advanced continuously through a central bore formed in an extrusion screw. The extrusion screw is rotated to force the plastic insulating compound along a cylindrical bore formed in an extrusion barrel and into an opening in an extrusion head communicating with the exit end of the bore in the extrusion cylinder. The filamentary core after passing axially through the rotating screw enters the extrusion head and emerges through an extrusion orifice in a forming die mounted in the head.

To insure a high quality insulating covering on the finished insulated conductor it is desirable to strain the plastic insulating compound to remove foreign matter and oversized particles which result in flaws in the covering. This straining is usually accomplished by passing the plastic material through a straining device comprising one or more screens and a perforated backing member for supporting the relatively fragile screens. However, this particular type of extrusion apparatus wherein the filamentary core advances axially through the screw presents the problem of providing a satisfactory straining device which will subject the entire flow of plastic insulating compound to a screening action and yet not interfere with the passage of the continuously advancing filamentary core. Further, it is desirable that the effective screening area of the strainer be sufficiently large to permit the desired quantity of compound to flow therethrough, even after the screens become partially clogged with accumulated particles strained from the compound.

It is an object of this invention to provide new and improved apparatus for plasticizing and straining organic plastic compounds.

Apparatus illustrating certain features of the invention may include a conduit, a stock screw rotatably mounted in the conduit for forcing plastic material through the conduit, an extrusion head having provided therein an opening forming an extension of the conduit, a tubular, articulated strainer positioned between the delivery end of the screw and the extrusion head in axial alignment with the conduit, and means for rotating the stock screw to force the plastic material along the bore and then through the strainer into the opening in the extrusion head.

A complete understanding of the invention may be obtained from the following detailed description of an apparatus forming a specific embodiment thereof, when read in conjunction with the appended drawings, in which:

Fig. 1 is a side elevation of the extrusion apparatus;

Fig. 3 is an enlarged, exploded, perspective view of an articulated backing plate forming a part of the apparatus.

Figure 2:
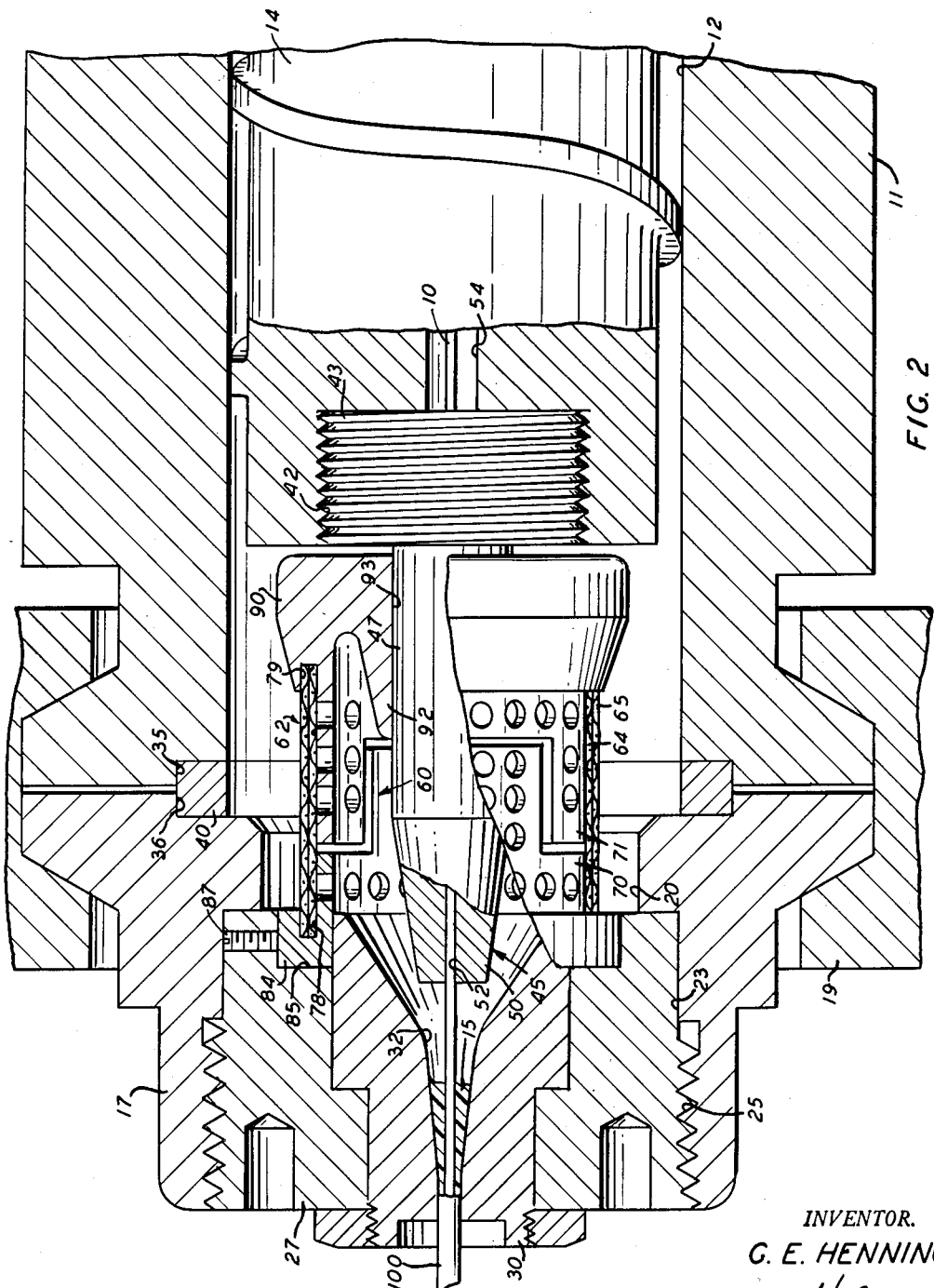
Fig. 2 is an enlarged, fragmentary, horizontal section taken along line 2—2 of Fig. 1, with parts thereof broken away.

Referring now in detail to the drawings, there is shown in Fig. 1 an extruder designed to apply a covering of an organic plastic compound on a filamentary conductor 10 which may be bare or covered with a textile or plastic covering. The extruder includes an extrusion cylinder 11 having a longitudinally extending extrusion bore 12 (Fig. 2) formed therein. Rotatably mounted in the extrusion bore 12 is an elongated stock screw 14, which is rotated by an electric motor 16 (Fig. 1) through a suitable gear train (not shown), to work and advance a mass 15 of organic plastic compound along the bore and through an extrusion head 17 under high pressure.

The extrusion head 17 is removably secured to the delivery end of the extrusion cylinder 11 by means of an adjustable split ring clamp 19, and is provided with a central cylindrical opening 20 extending longitudinally therethrough, which forms a continuation of the extrusion bore 12. The opening 20 is provided with a cylindrical counterbore 23 and a threaded counterbore 25 designed to receive a threaded die holder 27 designed to retain a shouldered extrusion die 30. The extrusion die 30 is provided with an elongated tapered extrusion orifice 32 having a bell-mouthed entrance communicating with the opening 20 and the extrusion bore 12. The longitudinal axis of the die orifice 32 is accurately centered and aligned longitudinally with the axis of the extrusion bore 12 and the opening 20.

The opposed faces of the extrusion cylinder 11 and the extruding head, respectively, are provided with complementary counterbores 35 and 36 adapted to receive a retaining ring 40 which serves as a seal to prevent leakage of the plastic compound between these faces. As shown in Fig. 2, the stock screw 14 does not extend the entire length of the extrusion cylinder, and the end face thereof is spaced a predetermined distance from the discharge end face of the cylinder.

Formed concentrically within the discharge end of the screw 14 is a threaded counterbore 42 designed to receive a threaded adapter 43 provided at one end of a core tube 45. An elongated cylindrical shank portion 47 of the core tube 45 has a reduced diameter and projects axially forward from the discharge end of the screw 14. The core tube 45 tapers frustoconically adjacent to its free end to form a nose portion 50 which extends partially into the bell-mouthed entrance of the extrusion orifice 32 in the die 30. An axial bore 52 extends through the core tube 45 and communicates with an axial bore 54 formed in the screw 14. The bore 54 extends the entire length of the screw 14 to provide a passage for the conductor 10, which is advanced continuously longitudinally through the bore 52 in the core tube 45 and emerges from the extruder through the extrusion orifice 32 in the die 30.

Surrounding the core tube 45 and the bell-mouthed entrance of the orifice 32 in the die 30 is a straining device which comprises a tubular, articulated, composite backing member 60 designed to support a flexible, cylindrical screen-pack 62 which fits closely around the periphery of the backing member. The screen-pack 62 is made up of two or more flexible, stainless steel screens 64 and 65. The screen 64 is preferably made of fine screening having a mesh size of 60, and the screen 65 is preferably made of coarser screening having a mesh size of 30.

The articulated, composite backing member 60 is made of two separate tubular backing elements 70 and 71 provided with intermeshing tongues 74—74 and 75—75, respectively (Fig. 3). As shown in Fig. 2, the backing elements 70 and 71 are complementary and are designed to be assembled in intermeshing relationship in a manner analogous to two intermeshing clutch elements. When the backing elements 70 and 71 are assembled, the cylindrical screen-pack 62 is retained at its opposite ends within annular grooves 78 and 79 formed therein.

The portions of the backing elements 70 and 71 constituting the intermediate portion of the composite backing member 60 adjacent to the screen-pack 62 are provided with a multiplicity of perforations 80—80 and 81—81 extending radially therethrough and arranged in a plurality of rows therearound. The forward end of the backing element 70 is provided with an annular flange 84 received closely within a complementary counterbore 85 formed in the die holder concentrically with respect to the opening 20 in the extrusion head 17. A set screw 87 threadedly mounted in the wall of the extrusion head 17 engages the flange 84 and holds the backing element 70 stationary.

The inner end of the backing element 71 adjacent to the forward face of the screw 14 is provided with an integrally-formed, cylindrical boss 90 having an internal hub 92. The hub 92 is provided with an axial bore 93 designed to receive the cylindrical shank portion 47 of the core tube 45, which projects concentrically through the composite backing member 60 from the end of the screw 14. A running clearance is provided between the walls of the bore 93 and the outer periphery of the shank portion 47 of the core tube 45. In this manner the backing element 71 is supported by the core tube 45, which rotates with the screw 14. The backing element 71 is restrained from rotating by virtue of the intermeshing engagement of the tongues 75—75 thereon with the tongues 74—74 on the fixedly mounted backing element 70. The maximum clearance provided between the intermeshing tongues 74—74 and 75—75 is preferably not greater than the diameter of the perforations 80—80 and 81—81.

*Operation*

In the operation of the extruder described hereinabove, the elongated stock screw 13 is rotated continuously to simultaneously work and force the mass 15 of plastic compound through the extrusion bore 12 formed in the extrusion cylinder 11 toward the discharge end thereof. The mass 15 of plastic compound is forced into the confined space surrounding the screen-pack 62, whereupon it is forced radially through the screens 64 and 65 and through the perforations 80—80 and 81—81 in the articulated, composite backing member 60 into the hollow interior thereof. The mass 15 of plastic compound then envelops the core tube 45 and flows forward under high pressure into the bell-mouthed entrance of the orifice 32 in the extrusion die 30 where it surrounds the filamentary conductor 10 as it leaves the core tube. The filamentary conductor 10, which is continuously advanced through the extruder, emerges from the orifice 32 in the die 30 with a substantially concentric covering of plastic compound to form a finished insulated conductor 100.

As the mass 15 of plastic compound is forced through the screens 64 and 65 of the cylindrical screen-pack 62, any oversized particles and foreign bodies are prevented by the screens from passing through the perforations 80—80 and 81—81 into the interior of the hollow backing member 60. Thus, the mass 15 of plastic compound which envelops the conductor 10 is substantially free of fault-producing particles and foreign bodies.

As the mass 15 of plastic compound is forced through the multiplicity of perforations 80—80 and 81—81 in the backing member 60, it is subjected to an additional working which contributes to the thorough plasticizing thereof. The cylindrical shape of the straining screens 64 and 65 and the backing member 60 affords a relatively large effective straining area. As a result, relatively large proportions of the surface area of the screens 64 and 65 may become clogged by oversized particles and foreign bodies strained from the plastic material and still leave sufficient unclogged areas to permit ample flow of plastic compound during extended operating runs without the necessity of stopping to clean or replace the straining screens 64 and 65.

Although every effort is made to design and construct an extruder in which there is no eccentricity in the rotation of the stock screw 14 and core tube 45, a small amount of eccentricity always exists inadvertently. As the stock screw 14 and core tube 45 rotate continuously during the operation, this eccentricity manifests itself in a tendency to oscillate the backing member 71 transversely relative to the backing member 70. However, because the composite backing member 60 is articulated, its component backing elements 70 and 71 are capable of movement relative to each other to absorb minor variations in alignment while still providing a complete and effective support for the cylindrical screen-pack 62.

If, instead of the articulated backing member 60 hereinabove described, a rigid, one-piece backing member of the same general shape were substituted and similarly positioned within the extruder, the latter would be subjected to bending forces which might cause a fatigue failure during the usual prolonged operating runs of the extruder. It may be readily visualized that even the slightest amount of eccentricity producing only very small transverse deflections at the end of a rigid, one-piece backing member supported by an eccentric core tube could result in high stresses in a thin-walled, rigid cylinder having a relatively short length. Manifestly, the use of the articulated backing plate 60 eliminates this difficulty.

It will be understood that the term "organic plastic compound" as employed in the specification and appended claims is meant to include thermoplastic materials, such as solid or cellular polyethylene, polyvinyl compounds, or the like, as well as thermosetting materials, such as rubber, neoprene compound and other synthetic rubbery elastomers, or the like, in solid or cellular forms.

Manifestly, various modifications of the hereinabove described, exemplary embodiment of the invention may be made without departing from the spirit and scope of the invention.

What is claimed is:

1. Apparatus for plasticizing and straining organic plastic material, which comprises a conduit, a stock screw mounted rotatably in the conduit for forcing plastic material through the conduit, an extrusion head having provided therein an opening forming an extension of the conduit, an elongated core tube mounted on the delivery end of the screw for rotation therewith and projecting axially therefrom into the opening in the extrusion head, a tubular, articulated strainer positioned between the delivery end of the screw and the extrusion head in axial alignment with the conduit, one end of said articulated strainer being supported by the core tube and the other end being mounted fixedly to the extrusion head surrounding the opening therein, and means for rotating the stock screw to force the plastic material along the bore and then through the strainer into the opening in the extrusion head.

2. In continuous extrusion apparatus including an extrusion cylinder having an extrusion bore provided with a delivery end, an extrusion head having an opening formed therein in communication with the delivery end of the extrusion bore and a stock screw for forcing organic plastic material through the extrusion bore into the opening in the extrusion head, the improved plasticizing and straining device which comprises a plurality of tubular, perforated intermeshing backing elements positioned between the delivery end of the screw and the extrusion head in coaxial alignment with the extrusion bore and so arranged as to form an articulated backing member, and a cylindrical screen supported by the backing member for straining oversized particles from the plastic material as it is forced toward the extrusion head.

3. In continuous extrusion apparatus including an extrusion cylinder having an extrusion bore provided with a delivery end, an extrusion head having an opening formed therein in communication with the delivery end of the extrusion bore, a stock screw for forcing organic plastic material through the extrusion bore into the opening in the extrusion head and an elongated core tube mounted on the delivery end of the screw for rotation therewith and projecting axially therefrom into the opening in the extrusion head, the improved plasticizing and straining device which comprises a tubular, articulated backing member positioned between the delivery end of the screw and the extrusion head in axial alignment with the extrusion bore, one end of said articulated backing member being supported by the core tube and the other end being supported by the extrusion head, and a cylindrical screen supported by the backing member for straining oversized particles from the plastic material as it is forced toward the extrusion head.

4. Apparatus for plasticizing and straining organic plastic compounds, which comprises an extrusion cylinder having a longitudinally extending extrusion bore therein, a stock screw mounted rotatably within the bore, an extrusion head secured to the delivery end of the extrusion cylinder and provided with an opening therein forming an extension of the extrusion bore, an elongated core tube mounted on the delivery end of the screw for rotation therewith and projecting axially therefrom into the opening in the extrusion head, and a plurality of intermeshing, tubular, perforated backing elements, one of said backing elements being attached fixedly to the extrusion head and surrounding the opening therein and another being supported by the core tube.

5. Apparatus for plasticizing and straining organic plastic compounds, which comprises an extrusion cylinder having a longitudinally extending extrusion bore therein, a stock screw mounted rotatably within the bore, an extrusion head secured to the delivery end of the extrusion cylinder and provided with an opening therein forming an extension of the extrusion bore, an elongated core tube mounted on the delivery end of the screw for rotation therewith and projecting axially therefrom into the opening in the extrusion head, and a composite, articulated backing member positioned between the delivery end of the screw and the extrusion head and mounted coaxially within the extrusion bore surrounding the core tube, said backing member comprising two intermeshing, tubular, perforated backing elements, one of said backing elements being attached fixedly to the extrusion head and surrounding the opening therein and the other being supported by the core tube.

6. Apparatus for plasticizing and straining organic plastic compounds, which comprises an extrusion cylinder having a longitudinally extending extrusion bore therein, a stock screw mounted rotatably within the bore, an extrusion head secured to the delivery end of the extrusion cylinder and provided with an opening therein forming an extension of the extrusion bore, an elongated core tube mounted on the delivery end of the screw for rotation therewith and projecting axially therefrom into the opening in the extrusion head, a tubular, articulated backing member positioned between the delivery end of the screw and the extrusion head and aligned coaxially with the core tube, said backing member including two intermeshing, perforated, tubular backing elements, one of which is attached fixedly to the extrusion head surrounding the opening therein and the other is supported on the core tube, and a flexible, sleeve-like screen surrounding and supported by the intermeshing backing elements for straining oversized particles from the plastic material.

7. In continuous extrusion apparatus including an extrusion cylinder having an extrusion bore provided with a delivery end, an extrusion head having an opening formed therein in communication with the delivery end of the extrusion bore, a stock screw mounted rotatably in the extrusion bore for forcing organic plastic material through said bore into the opening in the extrusion head and an elongated core tube mounted on the delivery end of the screw for rotation therewith and projecting axially therefrom toward the opening in the extrusion head, the improved plasticizing and straining device which comprises a composite, articulated backing member positioned between the delivery end of the screw and the extrusion head and aligned generally coaxially with the core tube, said composite backing member comprising two hollow, cylindrical backing elements, each provided with a multiplicity of perforations extending radially therethrough and a plurality of cooperating axially-extending tongues which are designed to intermesh and permit limited transverse movements of the backing elements relative to each other, one of said backing elements being secured fixedly with respect to the extrusion head and the extrusion cylinder and the other backing element being supported by the core tube, and a flexible cylindrical screen supported by the intermeshing backing elements for straining oversized particles from the plastic material.

8. In continuous extrusion apparatus including an extrusion cylinder having an extrusion bore provided with a delivery end, an extrusion head having an opening formed therein in communication with the delivery end of the extrusion bore and a counterbore formed concentrically with respect to said opening, a stock screw rotatably mounted within the extrusion bore for forcing organic plastic material through said bore into the opening in the extrusion head and an elongated, generally cylindrical core tube mounted on the screw for rotation therewith and projecting axially therefrom toward the opening in the extrusion head, the improved plasticizing and straining device which comprises a composite, articulated backing member positioned between the delivery end of the screw and the extrusion head and aligned coaxially within the extrusion bore surrounding the core tube, said composite backing member comprising two hollow, cylindrical backing elements, each provided with a multiplicity of perforations extending radially therethrough and a plurality of cooperating axially-extending tongues designed to intermesh and permit limited transverse movements of the backing elements relative to each other, means for mounting one of said backing elements fixedly within the counterbore formed in the extrusion head, means provided on the other backing element for supporting said element upon the rotatable core tube, and a flexible cylindrical screen supported by the intermeshing backing elements and fitting closely thereabout for straining oversized particles from the plastic material as it is forced toward the opening in the extruding head.

References Cited in the file of this patent

UNITED STATES PATENTS

| 2,412,979 | Garvey | Dec. 24, 1946 |
| 2,488,595 | Henning | Nov. 22, 1949 |